United States Patent [19]

Dupoyet

[11] 4,265,134
[45] May 5, 1981

[54] TRANSMISSION CHAIN

[75] Inventor: Guy J. M. Dupoyet, St. Simeon de Bressieux, France

[73] Assignee: Compagnie des Transmissions Mecaniques Sedis, Levallois Perret, France

[21] Appl. No.: 920,830

[22] Filed: Jun. 30, 1978

[30] Foreign Application Priority Data

Jul. 6, 1977 [FR] France ............................. 77 20793

[51] Int. Cl.² ............................................. F16G 13/02
[52] U.S. Cl. ............................................ 474/231; 59/8
[58] Field of Search ............ 74/250 R, 250 S, 250 C, 74/251 R, 245 R, 245 C, 245 S, 245 LP, 245 P; 59/8, 5; 198/850, 851, 832, 853

[56] References Cited

U.S. PATENT DOCUMENTS

| | | | |
|---|---|---|---|
| 1,166,460 | 1/1916 | Hughes | 59/8 |
| 1,994,840 | 3/1935 | Thoen | 74/245 R |
| 3,054,301 | 9/1962 | Kummerer et al. | 74/250 R |
| 3,093,235 | 6/1963 | Imse | 74/246 X |
| 3,359,815 | 12/1967 | Jeffrey et al. | 74/250 R |
| 3,421,313 | 1/1969 | Harada et al. | 74/250 X |
| 3,595,011 | 7/1971 | Nicholson | 59/8 |
| 4,036,072 | 7/1977 | McKeon | 59/8 |
| 4,102,216 | 7/1978 | Nagato | 74/250 R |
| 4,117,738 | 10/1978 | McKeon | 74/250 R |

FOREIGN PATENT DOCUMENTS

| | | | |
|---|---|---|---|
| 20011 | of 1896 | United Kingdom | 74/245 R |
| 981618 | 1/1965 | United Kingdom | 74/245 P |

*Primary Examiner*—James T. McCall
*Attorney, Agent, or Firm*—Burns, Doane, Swecker & Mathis

[57] ABSTRACT

The chain comprises alternately pivotally interconnected outer links and inner links. The outer links are formed by outer plates which are interconnected by spacer members and the inner links are formed by inner plates which are trapped between the outer plates and are rigid with tubular members through which the spacer members extend. Each inner plate comprises two planar portions of rounded or part-circular shape which are interconnected by a center portion. At least a part of the center portion is deformed relative to the general plane of the plate. The inner plates of a given link have their deformed part offset and facing outwardly of the link so as to constitute an entrance or lead-in for sprocket teeth. In this way, the engagement of the chain on the sprocket is facilitated, in particular when changing gear by means of a derailleur acting on the chain.

14 Claims, 28 Drawing Figures

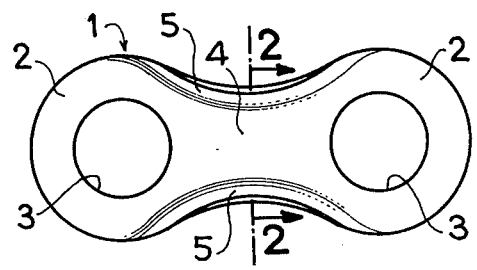
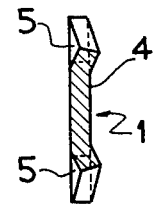
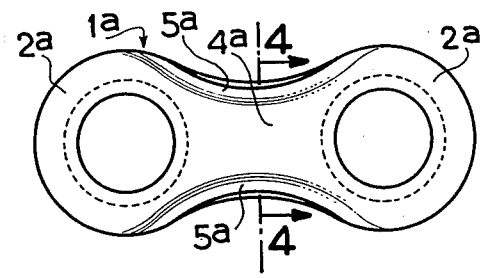
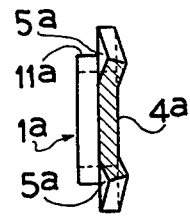
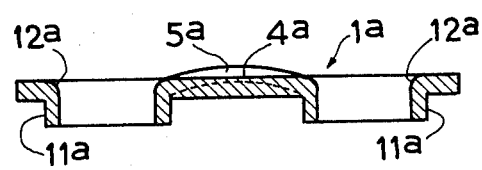
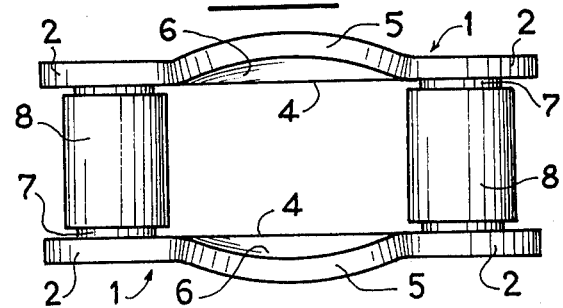

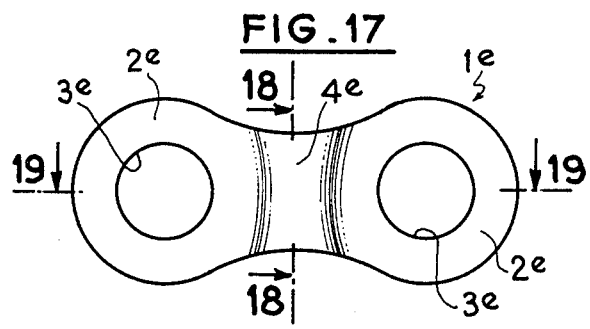
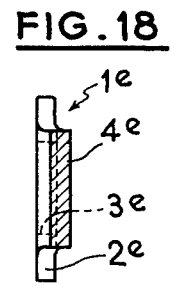
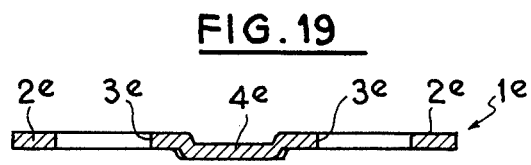
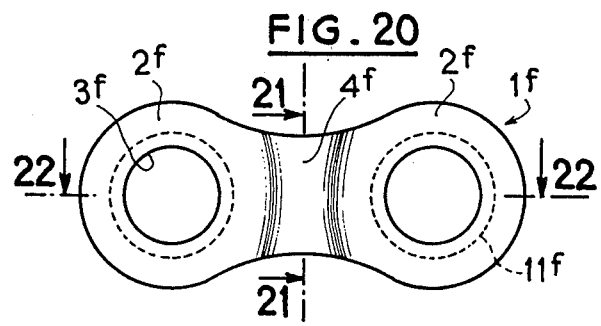
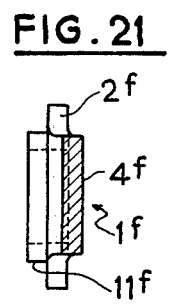
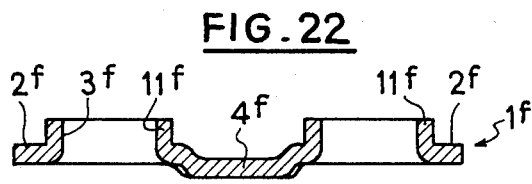

TRANSMISSION CHAIN

The present invention relates to transmission chains which may be used generally for the transmission of power, in particular for motors and vehicles of all types and more particularly for bicycles and, among the latter, mainly those comprising a derailleur for changing speed or gear and commonly known as multispeed bicycles.

Known transmission chains are usually formed by alternately outer links and inner links. The outer links are formed by two steel plates which are suitably cut out and may be treated and are termed outer plates. These two plates are interconnected by two cylindrical pins which may be solid or hollow and are an interference fit in the two plates and riveted in position. The inner links are also formed by two plates which are suitably cut out and may be treated and are termed inner plates. These two plates of the inner link are interconnected by two hollow spacer members termed bushings through which extend the pins of the outer link and thereby ensure the connection between the successive links. The bushings are fitted into the inner plates. Placed on the bushings between the inner plates is a roller which is freely rotatable on the bushing. This roller facilitates the engagement of the chain on the chain wheels and sprockets.

When such a chain is employed in a transmission having a derailleur speed-changing system the different speeds are embodied by a succession of sprockets which are axially equally spaced apart on a common hub.

When it is desired to change speed, that is the sprocket on the hub, a suitable device, namely a derailleur, is acted upon by the user and this derailleur acts on the part of the chain which arrives on the chain arrival side of the sprocket so as to bring the chain into the plane of each of the successive sprockets. Consequently, the chain is slightly distorted and it hooks onto the teeth of the sprocket and mounts on these teeth before the rollers of the chain drop into the recesses between these teeth for a proper engagement of the chain with the sprocket.

Research carried out with various modern means of investigation has revealed that, in the operation of the derailleur, different phenomena occur depending on whether the derailleur is changing up the speeds or changing down the speeds.

Changing up the speeds designates in the ensuing description the operation which comprises changing from one sprocket to another larger sprocket and changing down the speeds the opposite operation.

When changing up the speeds, the chain does not pass directly from one sprocket to the other but rubs or hooks by the ends of the pins or the edges of the plates against the following sprocket. Then, at a given moment, the plates are hooked by the teeth and mount on the latter and remain there a short moment in equilibrium and then suddenly drop into the normal position of engagement of the chain on the sprocket. This procedure delays the engagement of the required speed which is not as instantaneous as it would be desired.

When changing down the speeds, similar phenomena occur but, as soon as the chain has been bent by the action of the derailleur, it escapes from the teeth of a given sprocket and drops onto the sprocket of smaller diameter and usually engages the latter very rapidly.

it is consequently clear that, in order to effect a shifting operation on the chain by means of the derailleur, a hooking of the ends of the pins should be avoided in order to facilitate the sliding of the plates against the side of the sprocket and the passage of the plates on the teeth. Also, the chain should have a certain flexibility and a high capacity for very rapidly presenting the inner face of the inner plates in alignment with the side of the teeth of the sprocket on which the chain is to be engaged, since, in any case, when the chain is engaged on the sprocket, it is the inner faces of the inner plates which guide the chain on the sprocket and not the outer plates which are more specifically provided to transmit the pulling or driving forces.

An object of the present invention is to provide a transmission chain which permits speed-changing operations by means of a derailleur which are easy, precise and effective within a minimum period of time, owing to a special arrangement of the inner plates.

According to the invention, there is provided a transmission chain comprising alternately outer links and inner links which are pivotally interconnected, the outer links being formed by outer plates which are interconnected by spacer members and the inner links being formed by inner plates which are trapped between the outer plates and are rigid with tubular members through which said spacer members extend, wherein the inner plates each have two planar portions of rounded or part-circular shape which are interconnected by a center portion at least a part of which is deformed relative to the general plane of the plate, the inner plates of a given link having their deformed portion offset and facing outwardly of the link so as to constitute an entrance for the teeth of the sprockets whereby the engagement of the chain on the teeth is facilitated, in particular when the chain is shifted by a derailleur.

In a preferred embodiment, the center portion of the inner plate has lateral edge portions which are deformed and offset from the same side of the plate, whereas the median part of the center portion is planar and in the same plane as said planar portions.

According to another embodiment, the center portion is deformed throughout the width thereof.

According to a feature of the invention, the deformed center portion is offset in a plane parallel to the general plane of the plate.

According to another feature of the invention, the deformed center portion has in longitudinal section a very wide V-shape having a flat bottom and an evolutive profile.

According to another embodiment, the center portion comprises a planar median part offset in a plane parallel to the general plane of the plate and two lateral edge portions which are deformed and offset outwardly of the link relative to the plane of said median part.

According to a feature of the invention, the pins of the outer links are flush with the outer planar surface of the outer plates of the male links or very slightly project therefrom to an extent less than about 1/10 to 2/10 of a millimeter.

According to another feature of the invention, the tubular members rigid with the inner plates are formeed by two hollow cylindrical spigots carried by each plate, the inner plates being freely mounted on the spacer members and their lateral displacements being limited, inwardly of the link, by rollers of the chain which are mounted on the spigots and, outwardly, by the outer plates of the outer links.

According to another feature of the invention, the outer plates of the outer links carry two hollow cylindrical spigots which are asymmetrical relative to the longitudinal axis of the chain so as to increase the section of the metal in the stressed part thereof.

According to another feature of the invention, the inner and/or outer plates have a profile which is asymmetrical relative to the longitudinal axis of the chain and are mounted in reverse relation on the same link so as to permit a rapid disengagement of the chain when shifting the chain by means of a derailleur.

Further features and advantages of the invention will be apparent from the ensuing description with reference to the accompanying drawings which are given by way of example and in which:

FIG. 1 is a plan view of an inner plate of a transmission chain according to the invention;

FIG. 2 is a sectional view taken on line 2—2 of FIG. 1;

FIG. 3 is a plan view of a modification of an inner plate in which the latter is provided with cylindrical spigots;

FIG. 4 is a sectional view taken on line 4—4 of FIG. 3;

FIG. 5 is a longitudinal sectional view of the plate shown in FIG. 3;

FIG. 6 is an elevational view of an inner link formed by plates of the type shown in FIG. 1;

FIG. 17 is a plan view of a modification of an inner plate of a transmission chain according to the invention;

FIG. 18 is a sectional view taken on line 18—18 of FIG. 17;

FIG. 19 is a sectional view taken on line 19—19 of FIG. 17;

FIG. 20 is a plan view of an inner plate similar to the plate of FIG. 17, but in which the plate is provided with cylindrical spigots;

FIG. 21 is a sectional view taken on line 21—21 of FIG. 20;

FIG. 22 is a sectional view taken on line 22—22 of FIG. 20;

Figure 13:
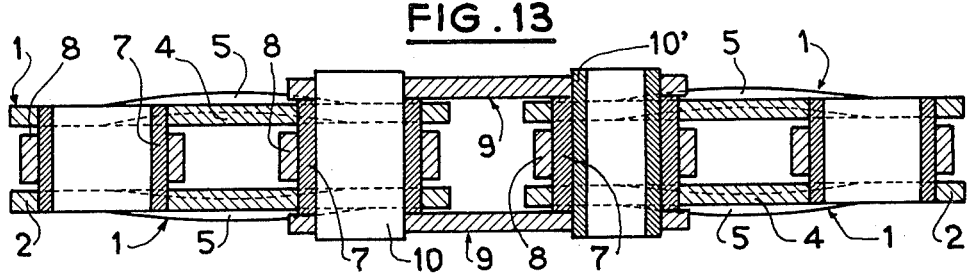
FIG. 13 is a sectional view of a chain formed with inner plates of the type shown in FIGS. 1 and 2, the outer links having solid or hollow spacer members.

With reference first to FIGS. 1 and 2, the latter show an inner plate 1 of an inner link of a chain. This plate has two planar part-circular end portions 2 each of which is provided with an aperture 3 for receiving a spacer member or bushing, the part-circular portions being interconnected by a center portion having a planar median part 4 in the same plane as the part-circular portions 2 and having outer edge portions 5 which are deformed laterally outwardly of the same side relative to the plane of the planar median part 4. Two plates 1 such as that just described are arranged to form an inner link as shown in FIG. 6. the two end portions 2 of each plate respectively define inner faces which are contained in a common plane and confront the inner faces of the other plate. An entrance or lead-in 6 are defined by the inner faces of the deformed portions 5 which inner faces are offset laterally outwardly of the link relative to said common plane, this entrance facilitating the engagement of the teeth of sprockets on the chain. It will be seen that the inner faces of the deformed portions 5 extend from the peripheral edge of the plate 1. The plates 1 are interconnected by a spacer member or bushing 7 on which a roller 8 is freely rotatable in the known manner. FIG. 13 shows a chain formed by such inner links which are interconnected by conventional outer links which are formed by outer plates 9 interconnected by solid pins 10 or hollow pins 10'.

Figure 14:
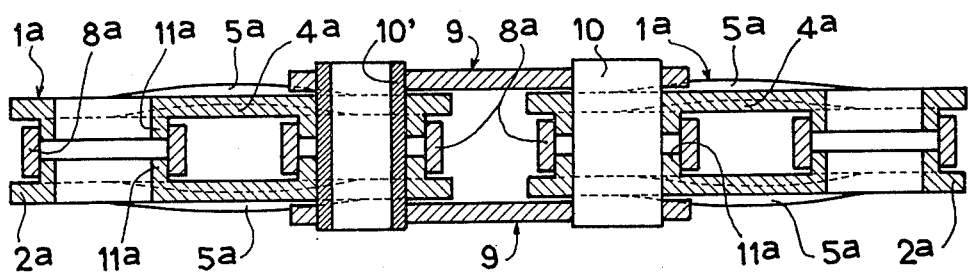
FIG. 14 is a sectional view of a chain formed with inner plates of the type shown in FIGS. 3, 4 and 5, the outer links comprising solid or hollow spacer members.

With reference now to FIGS. 3, 4, 5 and 14, it can be seen how a plate 1$^a$ having hollow cylindrical spigots may be substituted for the plate 1 just described to form an inner link of a chain. As before, the plate 1$^a$ has two part-circular portions 2$^a$ interconnected by the planar median portion 4$^a$ which is in the same plane as the part-circular portions 2$^a$ and has on its edges a divergent portion 5$^a$. The inner faces of the end portions 2$^a$ and the inner face of the median portion 4$^a$ are contained in a common plane. However, the two part-circular portions 2$^a$ instead of each merely defining an aperture comprise a cylindrical spigot 11$^a$ rigid with the planar portion 2$^a$. According to a first embodiment, and when the thickness of the plate 1$^a$ is not excessive, the spigots 11$^a$ are obtained by a press operation, rotary extrusion or any other forming operation or hot or cold deformation (forging). According to another embodiment, the spigots 11$^a$ may be assembled with the planar portions 2$^a$ and rendered rigid with the latter by any means such as welding, riveting, screwing or adhesion. In any case, the thickness of the planar portions 2$^a$ and the thickness of the walls of the spigots $11^a$ need not be the same. This is in particular so when the spigots $11^a$ are obtained by a press operation from a planar blank blanked from sheet steel. Note also that the formed part has a rounded edge $4^a$ at the top of the bore of the cylindrical spigot $11^a$ resulting from the flow of the metal in the course of the press operation. With such plates an inner link similar to that shown in FIG. 6 may be formed. FIG. 14 shows a chain formed by such inner links which are interconnected by outer links identical to those shown in FIG. 13. In such a chain, the inner plates $1^a$ are free and their lateral displacements are limited inwardly only by the rollers $8^a$ and outwardly only by the outer plates 9.

Figure 7:
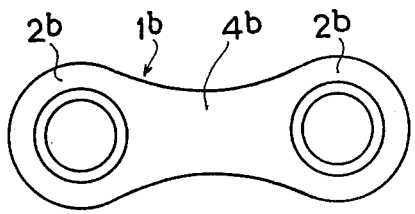
FIG. 7 is a plan view of an outer plate having spigots for the chain according to the invention.
Figure 8:
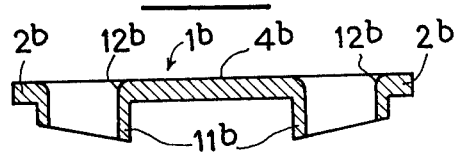
FIG. 8 is a longitudinal sectional view of the plate shown in FIG. 7.
Figure 15:
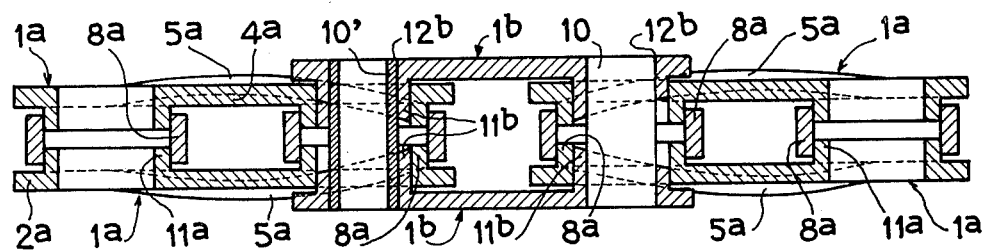
FIG. 15 is a sectional view of a chain formed with inner plates of the type shown in FIGS. 3, 4 and 5 and outer plates which have spigots and are asymmetrical and of the type shown in FIGS. 7 and 8 and interconnected by solid or hollow spacer members.

FIGS. 7, 8 and 15 show how the conventional outer links may be replaced by links formed by outer plates having spigots. Such plates $1^b$ comprise two part-circular portions $2^b$ interconnected by a planar portion $4^b$, but the latter does not have divergent edge portions. The portion $2^b$ has a hollow cylindrical spigot $11^b$ with a rounded edge $12^b$ at the top of its bore. In a preferred embodiment of the invention, the spigots $11^b$ are asymmetrical, that is to say longer on the longitudinally innermost side of the spigot than on the outermost side thereof as shown in FIG. 8. This feature permits limiting the wear of the chain by concentrating the metal in the stressed part of the plate which, in its outer plate location in the chain, is subjected solely to tensile stresses. Two outer plates $1^b$ rendered rigid with each other by solid spacer members 10 or hollow spacer members 10' which are a drive fit in the spigots $11^b$ and in no way subjected to the forces to which the chain is subjected and merely serve to render the outer plates $1^b$ rigid with each other, form the outer link of a chain such as shown in FIG. 15 in which the inner links are formed with inner plates $1^a$. As the spacer members 10 or 10' are not under tensile stress they may be made lighter relative to spacer members of known chains. Moreover, the rounded edge $12^b$ of the spigots enable the spacer members to be riveted without however extending beyond the outer surface of the plate for example more than 1/10 to 2/10 mm.

Figure 9:
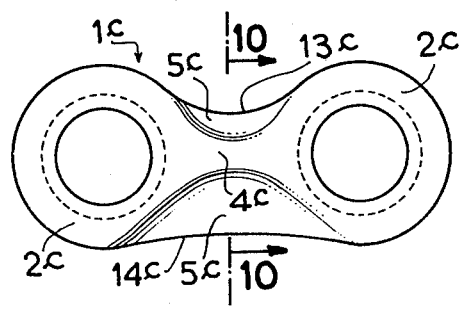
FIG. 9 is a plan view of a modification of the inner plate having spigots shown in FIG. 3 in which the plate has an asymmetrical profile.
Figure 10:
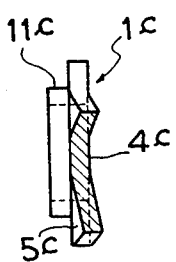
FIG. 10 is a sectional view taken on line 10—10 of FIG. 9.

With reference now to FIGS. 9 and 10, the inner plates $1^c$ are similar to the plates shown in FIGS. 3 and 4, but have an asymmetrical outer shape, namely a side $13^c$ which is much more deeply notched than the other side $14^c$. These plates $1^c$ moreover have all the features of the plates $1^a$, namely divergent edge portions $5^c$, symmetrical hollow cylindrical spigots $11^c$ and a planar median portion $4^c$ interconnecting two planar part-circular portions $2^c$ in the same plane as the latter so that the portions $2^c$ and $4^c$ define inner faces for the link which are contained in a common plane.

Figure 11:
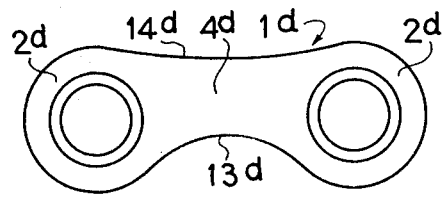
FIG. 11 is a plan view of an outer plate having spigots which have an asymmetrical profile.
Figure 12:
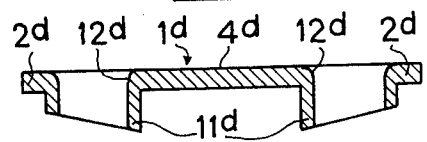
FIG. 12 is a longitudinal sectional view of the plate shown in FIG. 11.

Likewise, the outer plates $1^d$ of FIGS. 11 and 12 are similar to the outer plates $1^b$ of FIGS. 7 and 8, but have an asymmetrical profile with a side $13^d$ much more deeply notched than the other side $14^d$. These plates $1^d$ also have all the other features of the plates $1^b$, namely a planar center portion $4^d$ interconnecting two part-circular portions $2^d$ which carry hollow cylindrical spigots $11^d$ which are preferably asymmetrical as shown.

Figure 16:
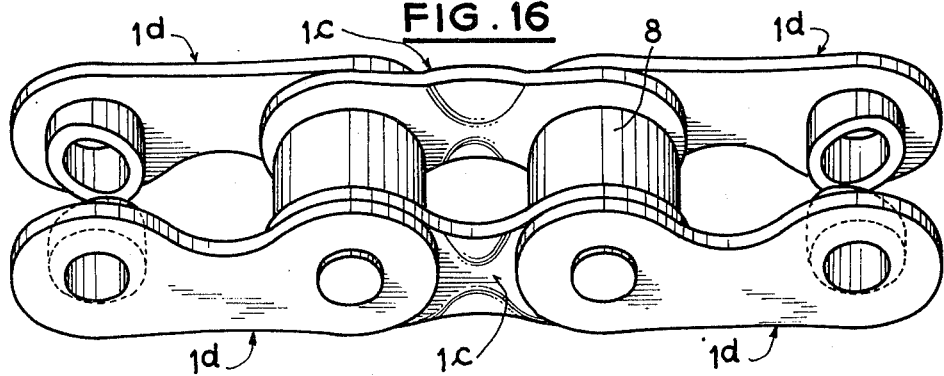
FIG. 16 is an isometric view of a chain formed with inner plates having spigots and an asymmetrical outer profile of the type shown in FIGS. 9 and 10, and outer plates having an asymmetrical outer profile of the type shown in FIGS. 11 and 12, these plates being interconnected by solid or hollow spacer members.

FIG. 16 shows how the plates $1^c$ and $1^d$ are mounted in the chain in reversed relation in each link, the notched side of one plate facing in the opposite direction to the notched side of the other plate. The features and advantages of this assembly are explained hereinafter. In devices for changing speed or gear by means of a derailleur, a certain number of sprockets having a decreasing number of teeth, usually 3, 5 or 7, are assembled on the rear hub. These sprockets form an ascending or descending stair-like arrangement which the chain must travel across to change speed. The arrangement adopted for the plates $1^c$ and $1^d$ of the chain permits choosing for the mounting of the chain the suitable direction so that in the direction for changing up the speeds, the plates are as notched as deeply as possible. This has for effect to require, when shifting the chain, a minimum raising thereof for passing from one sprocket to the immediately higher sprocket. In the other direction for changing down the speeds, on the contrary the chain must be guided laterally, which function is performed by the unnotched side of the plates. Moreover, the divergent shape of the inner link plates facilitates in both cases (changing up or changing down the speeds) the positioning of the chain on the teeth of the sprocket (engagement). Further, this action may be completed by internally bevelling the median part of the outer plates.

FIGS. 17 to 19 show an inner plate $1^e$ similar to the plate 1 and having two part-circular portions $2^e$ each of which has an aperture $3^e$ for receiving a spacer bushing and interconnected by a centre portion $4^e$ which is deformed throughout its width and offset in a plane parallel to the general plane of the plate defined by the two planar portions $2^e$, so that the center portion $4^e$ defines an inner face in the link which face is contained in a plane which is parallel to but laterally offset outwardly of the link relative to the plane in which the inner faces of the portions $2^e$ are contained. The deformed center portion $4^e$ has in longitudinal section a very wide V-shape having a flat bottom and an evolutive profile. Two plates $1^e$ such as that just described may be assembled in the same way as the plates 1 to form an inner link of a transmission chain. The inner links formed in this way are interconnected by outer links which may be constructed in the conventional manner or in the manner described hereinbefore.

As in the case of the plate 1, the center portions $4^e$, which are offset laterally outwardly of the link, define on the latter an entrance or lead-in which facilitates the engagement of the teeth of the sprocket in the chain. However, the lateral offsetting or deformation of the whole of the center portion $4^e$ of the inner plate permits bringing a part of the inner face of the inner plate into approximate alignment with the inner face of the outer plate in the region in which the tooth of the sprocket engages in the chain. This facilitates the guiding of the chain and its engagement on the successive sprockets when changing speed with a derailleur.

Reference will now be made to FIGS. 20 to 22 in which the same reference numerals as those of FIGS. 17 to 19, provided with the letter f instead of the letter e, have been used for designating similar parts. These FIGS. 20 to 22 show an inner plate $1^f$ similar to the plate $1^e$ except that instead of having a single aperture, the part-circular planar portions $2^f$ each have a tubular circular spigot $11^f$ rigid with the planar portion $2^f$. These spigots are identical to those of the plate $1^a$ and will therefore not be described in detail here. The plates $1^f$ may be assembled in the same way as the plates $1^a$ to form an inner link and a chain such as those shown in FIGS. 6 and 14 respectively.

Figure 23:
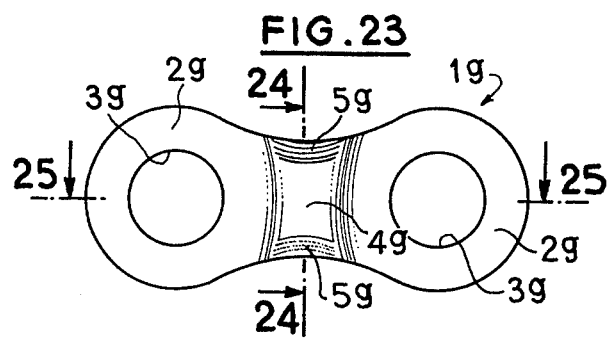
FIG. 23 is a plan view of another embodiment of an inner plate of a transmission chain according to the invention.
Figure 24:
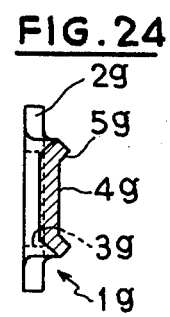
FIG. 24 is a sectional view taken on line 24—24 of FIG. 23.
Figure 25:
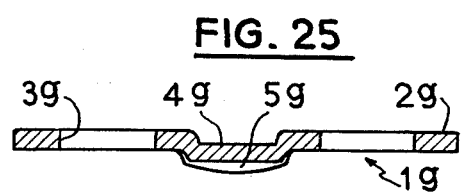
FIG. 25 is a sectional view taken on line 25—25 of FIG. 23.

FIGS. 23 to 25 represent an inner plate $1^g$ for an inner link which differs from the plate $1^e$ described above solely in the shape of its center portion. Indeed, the center portion of the inner plate $1^g$ comprises a planar median part $4^g$ which is deformed and offset in a plane parallel to the general plane of the plate defined by the two planar portions $2^b$ and two lateral edge portions $5^g$ which are also deformed and offset relative to the plane of the median part $4^g$. More precisely, these lateral edge portions $5^g$ are offset relative to the plane of the median part $4^g$ in the same direction in which said median part $4^g$ is offset relative to the general plane of the plate so that, in the assembled position of two plates $1^g$ to form an inner link, the lateral edge portions $5^g$ are divergent laterally outwardly of the link and perform a function similar to that of the deformed edge portions 5 of the plate 1. The median part $4^g$ defines an inner face in the link which face is contained in a plane which is laterally offset outwardly of the link relative to the plane of the inner faces of the portions $2^b$. Further, the plates $1^g$ have apertures $3^g$ in the portions $2^g$ thereof and can be assembled to form inner links and transmission chains as described hereinbefore with reference to plate 1.

Figure 26:
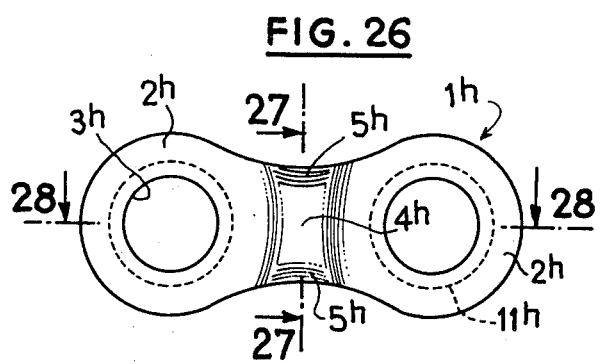
FIG. 26 is a plan view of an inner plate similar to the plate of FIG. 23 but provided with cylindrical spigots.
Figure 27:
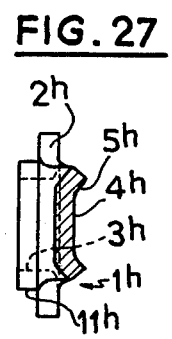
FIG. 27 is a sectional view taken on line 27—27 of FIG. 26.
Figure 28:
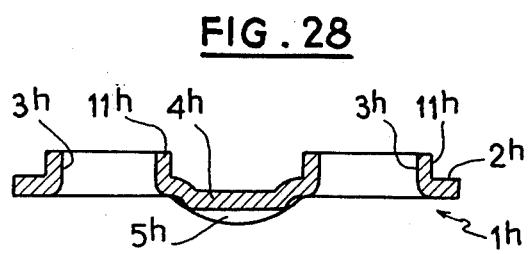
FIG. 28 is a sectional view taken on line 28—28 of FIG. 26.

FIGS. 26 to 28 illustrate a modification $1^h$ of an inner plate which differs from the plate $1^g$ solely in the presence of spigots $11^h$ which are identical to the spigots $11^f$ of the plate $1^f$. In these FIGS. 26 to 28, the same reference numerals as those of FIGS. 23 to 25, provided with a letter f instead of the letter g, are employed for designating similar parts.

The plates $1^g$ and $1^h$ combine the advantages of the plates 1 or $1^a$ having deformed edge portions with the advantages of the plates $1^e$ and $1^f$ having a deformed center portion.

Having now described our invention what we claim as new and desire to secure by Letters Patent is:

1. A transmission chain for cooperation with sprockets and comprising alternately outer links and inner links, each outer link comprising two outer plates and spacer members interconnecting the outer plates and each inner link comprising two generally parallel longitudinally extending laterally confronting and laterally spaced apart inner plates and tubular members rigid with the inner plates, the inner plates being trapped between the outer plates and the spacer members extending through the tubular members, each inner plate having two end portions, a center portion which interconnects said end portions and a peripheral edge which is curvilinear in the region of said end portions, said end portions respectively defining planar inner faces which are contained in a common plane, the center portion of each inner plate having at least one part which is deformed throughout its thickness and defines an inner face which extends from said peripheral edge in said center portion and is offset from said common plane laterally outwardly of the corresponding inner link, and the inner link having an outer face which is correspondingly offset laterally outwardly away from the tubular members in said at least one part of said center portion, whereby the lateral spacing between the inner faces defined by said deformed part of said inner portions is larger than the lateral spacing between the inner faces of said end portions which facilitates the engagement of teeth of the sprockets in the inner links, in particular when the chain is shifted by a derailleur.

2. A transmission chain for cooperation with sprockets and comprising alternately outer links and inner links, each outer link comprising two outer plates and spacer members interconnecting the outer plates and each inner link comprising two generally parallel longitudinally extending laterally confronting and laterally spaced apart inner plates and tubular members rigid with the inner plates, the inner plates being trapped between the outer plates and the spacer members extending through the tubular members, each inner plate having two end portions, a center portion which interconnects said end portions and a peripheral edge which is curvilinear in the region of said end portions, said end portions respectively defining planar inner faces which are contained in a common plane, the center portion of each inner plate having at least one part which is deformed throughout its thickness and defines an inner face which extends from said peripheral edge in said center portion and is offset from said common plane laterally outwardly of the corresponding inner link, and the inner link having an outer face which is correspondingly offset laterally outwardly away from the tubular members in said at least one part of said center portion, whereby the lateral spacing between the inner faces defined by said deformed part of said inner portions is larger than the lateral spacing between the inner faces of said end portions which facilitates the engagement of teeth of the sprockets in the inner links, in particular when the chain is shifted by a derailleur, the inner plates having an asymmetrical outer profile as viewed in a direction perpendicular to said common plane and the inner plates of each inner link being disposed in reverse relation to each other.

3. A transmission chain for cooperation with sprockets and comprising alternatively outer links and inner links, each outer link comprising two outer plates and spacer members interconnecting the outer plates and each inner link comprising two generally parallel longitudinally extending laterally confronting and laterally spaced apart inner plates and tubular members rigid with the inner plates, the inner plates being trapped between the outer plates and the spacer members extending through the tubular members, each innerplate having two end portions, a center portion which interconnects said end portions and a peripheral edge which is curvilinear in the region of said end portions, said end portions respectively defining planar inner faces which are contained in a common plane, the center portion of each inner plate having at least one part which is deformed throughout its thickness and defines an inner face which extends from said peripheral edge in said center portion and is offset from said common plane laterally outwardly of the corresponding inner link, and the inner link having an outer face which is correspondingly offset laterally outwardly away from the tubular members in said at least one part of said center portion, whereby the lateral spacing between the inner faces defined by said deformed part of said inner portions is larger than the lateral spacing between the inner faces of said end portions which facilitates the engagement of teeth of the sprockets in the inner links, in particular when the chain is shifted by a derailleur, the outer plates having an asymmetrical outer profile as viewed in a direction perpendicular to said common plane and the outer plates of each outer link being disposed in reverse relation to each other.

4. A chain as claimed in claim 1, wherein the center portion of each inner plate has two of said deformed part on opposite sides of the width of the center portion and a median part of the center portion which defines an inner planar face which is contained in said common plane and is intermediate said two deformed parts.

5. A chain as claimed in claim 1, wherein the center portion of each inner plate is deformed throughout the thickness and width of the center portion and said inner face of the center portion extends from one side to the other of the width of the center portion.

6. A chain as claimed in claim 5, wherein the inner face of the deformed center portion is completely offset and contained in a plane laterally spaced from and parallel to said plane in which the inner faces of said end portions are contained.

7. A chain as claimed in claim 6, wherein the deformed center portion has a longitudinal section in the shape of a very wide V having a flat bottom and an evolutive profile.

8. A chain as claimed in claim 5, wherein said inner face of the center portion comprises a planar medium part which is offset and contained in a plane which is laterally spaced from and parallel to said plane in which the inner faces of said end portions are contained and two lateral edge parts which are offset outwardly of the inner link relative to the plane of the median part.

9. A chain as claimed in claim 1, wherein the outer plates have a planar outer surface and the spacer members have ends which are flush with said planar outer surface.

10. A chain as claimed in claim 1, wherein the outer plates have a planar outer surface and the spacer members have ends which very slightly project from the outer surface to an extent of no more than about 1/10 to 2/10 mm.

11. A chain as claimed in claims 1, 4, 5 or 6, wherein the tubular members consist of two hollow cylindrical spigots carried by each inner plate, rollers are rotatively mounted on the spigots, the inner plates are freely mounted on the spacer members and lateral displacements of the inner plates are limited inwardly of the inner link by the rollers and outwardly of the inner link by the outer plates of the outer links.

12. A chain as claimed in claims 1, 4, 5 or 6, wherein the outer plates of the outer links carry two hollow cylindrical spigots through which spigots the spacer members extend, the spigots being asymmetrical relative to a longitudinal axis of the chain so as to increase the effective cross-sectional area of the outer plates in a stressed part of the outer plates.

13. A chain as claimed in claim 2, wherein said asymmetrical profile comprises a first notch on one longitudinally extending side of the inner plate and a second notch which is deeper than the first notch on the opposite side of the inner plate, said notches being located between said two end portions.

14. A chain as claimed in claim 3, wherein said asymmetrical profile comprises a first notch on one longitudinally extending side of the outer plate and a second notch which is deeper than the first notch on the opposite side of the outer plate.

* * * * *